US009119248B2

(12) United States Patent
Motabar et al.

(10) Patent No.: US 9,119,248 B2
(45) Date of Patent: Aug. 25, 2015

(54) METHOD FOR CONTROLLING A LIGHT EMITTING DEVICE IN A COOKTOP APPLIANCE

(71) Applicant: General Electric Company, Schenectady, NY (US)

(72) Inventors: Payam Motabar, Louisville, KY (US); Paul Bryan Cadima, Prosepct, KY (US); James Carter Bach, Seymour, IN (US)

(73) Assignee: General Electric Company, Schenectady, NY (US)

( * ) Notice: Subject to any disclaimer, the term of this patent is extended or adjusted under 35 U.S.C. 154(b) by 366 days.

(21) Appl. No.: 13/718,108

(22) Filed: Dec. 18, 2012

(65) Prior Publication Data

US 2014/0167643 A1 Jun. 19, 2014

(51) Int. Cl.
*G05F 1/00* (2006.01)
*H05B 37/02* (2006.01)
*H05B 39/04* (2006.01)
*H05B 33/08* (2006.01)

(52) U.S. Cl.
CPC ........ *H05B 33/0806* (2013.01); *H05B 33/0818* (2013.01); *H05B 33/0854* (2013.01); *Y02B 20/346* (2013.01)

(58) Field of Classification Search
CPC ........... H05B 33/0806; H05B 33/0818; H05B 33/0854; H05B 33/0866
USPC .................. 315/291, 297, 307, 309; 340/584, 340/815.4, 815.45, 815.49; 219/445.1, 219/446.1, 448.11, 448.12
See application file for complete search history.

(56) References Cited

U.S. PATENT DOCUMENTS

| | | | |
|---|---|---|---|
| 6,797,297 B2* | 9/2004 | Schneider | 426/231 |
| 6,963,175 B2 | 11/2005 | Archenhold et al. | |
| 7,067,995 B2 | 6/2006 | Gunter et al. | |
| 7,091,874 B2* | 8/2006 | Smithson | 340/815.45 |
| 7,220,015 B2 | 5/2007 | Dowling | |
| 7,286,123 B2* | 10/2007 | Yang | 345/204 |
| 7,538,499 B2* | 5/2009 | Ashdown | 315/309 |
| 7,635,957 B2* | 12/2009 | Tripathi et al. | 315/309 |
| 7,755,303 B2* | 7/2010 | Johnson et al. | 315/309 |
| 8,476,847 B2* | 7/2013 | Riesebosch | 315/309 |
| 2004/0238524 A1 | 12/2004 | Lerner | |
| 2005/0082553 A1* | 4/2005 | Yamamoto et al. | 257/83 |
| 2009/0021955 A1* | 1/2009 | Kuang et al. | 362/479 |
| 2010/0245228 A1* | 9/2010 | Chen et al. | 345/102 |
| 2010/0295688 A1* | 11/2010 | Wu et al. | 340/584 |

FOREIGN PATENT DOCUMENTS

| | | | | |
|---|---|---|---|---|
| JP | 4-55624 | * | 2/1992 | 219/447.1 |
| TW | 201039694 A | | 11/2010 | |

* cited by examiner

*Primary Examiner* — Kenneth B Wells
(74) *Attorney, Agent, or Firm* — Dority & Manning, P.A.

(57) ABSTRACT

Systems and methods of variably controlling a driver signal to a light emitting device located proximate to a burner assembly of an appliance are provided. The driver signal can be adjusted based on a signal indicative of a temperature in a region proximate the light emitting device. The signal indicative of a temperature of the burner assembly temperature can be generated by a temperature sensor or the signal can be based on an anticipated temperature profile of the burner assembly. The driver signal can be adjusted based on the signal indicative of the temperature of the burner assembly temperature using pulse width modulation.

15 Claims, 6 Drawing Sheets

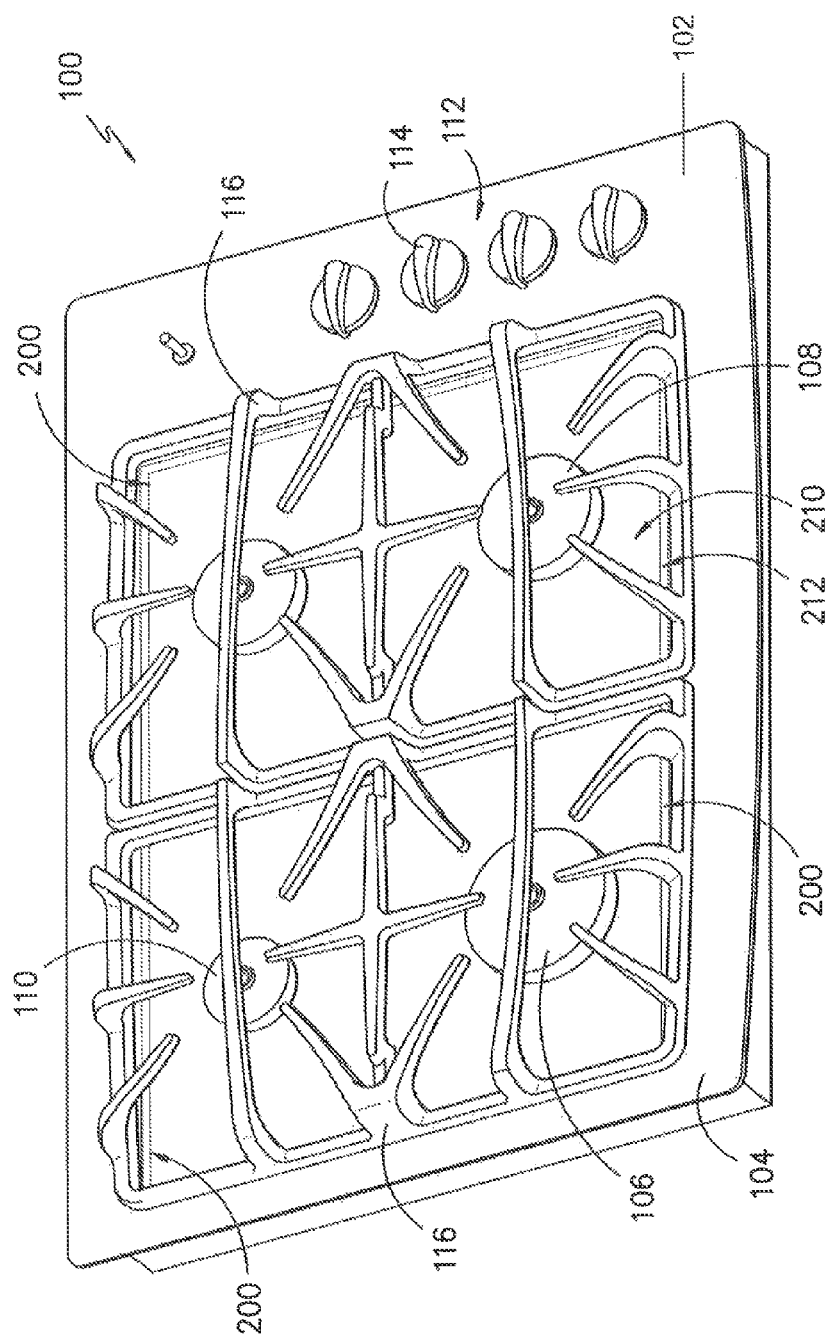
FIG. -1-

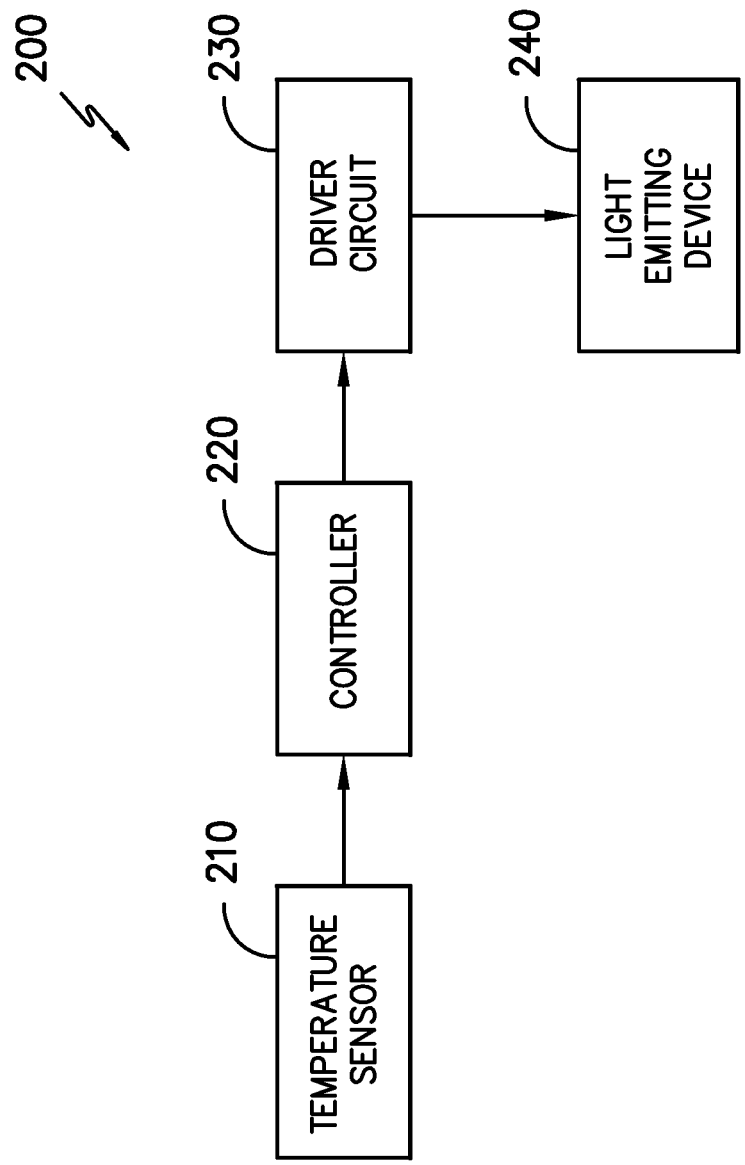
FIG. -2-

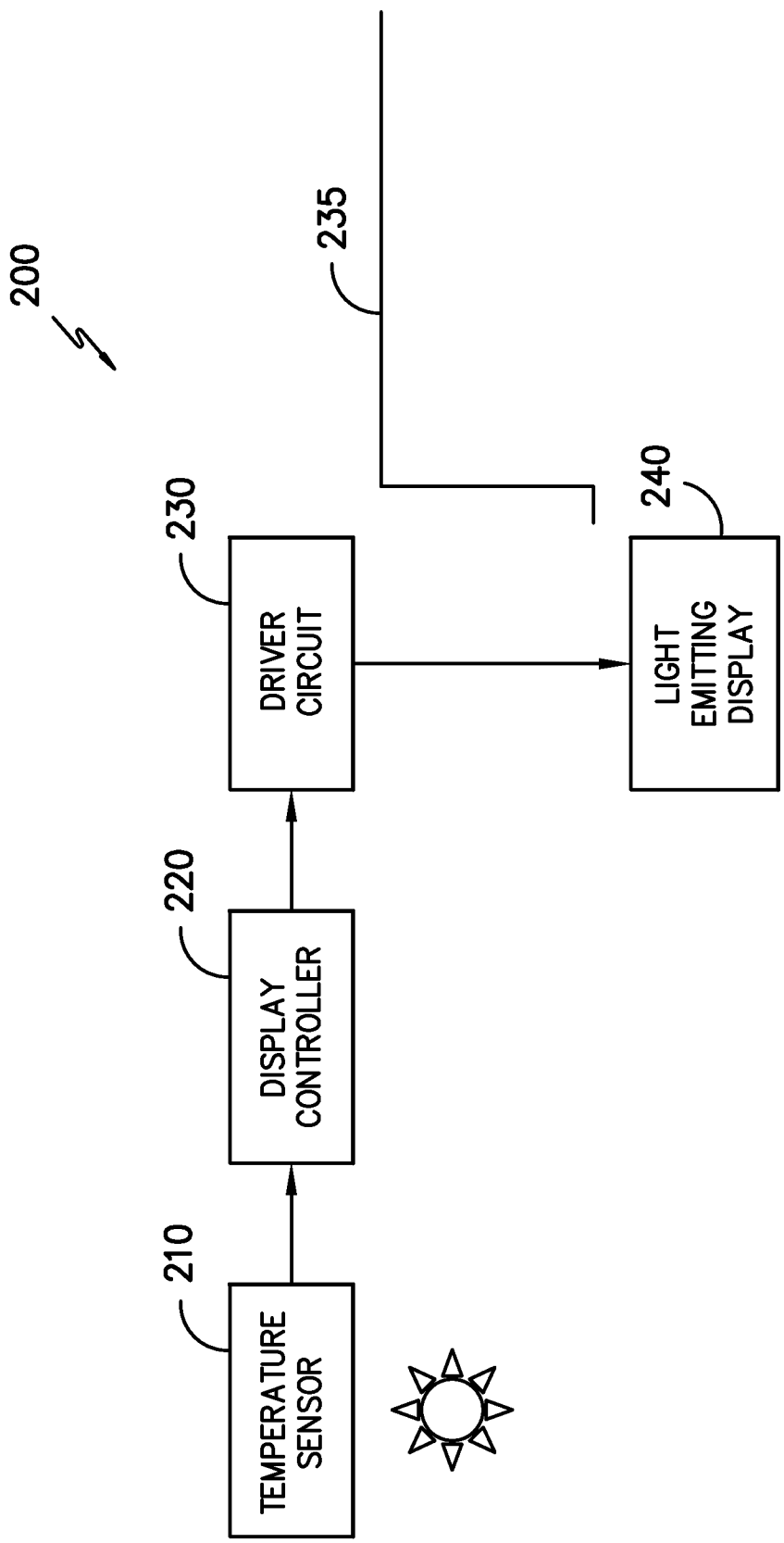
FIG. -3-

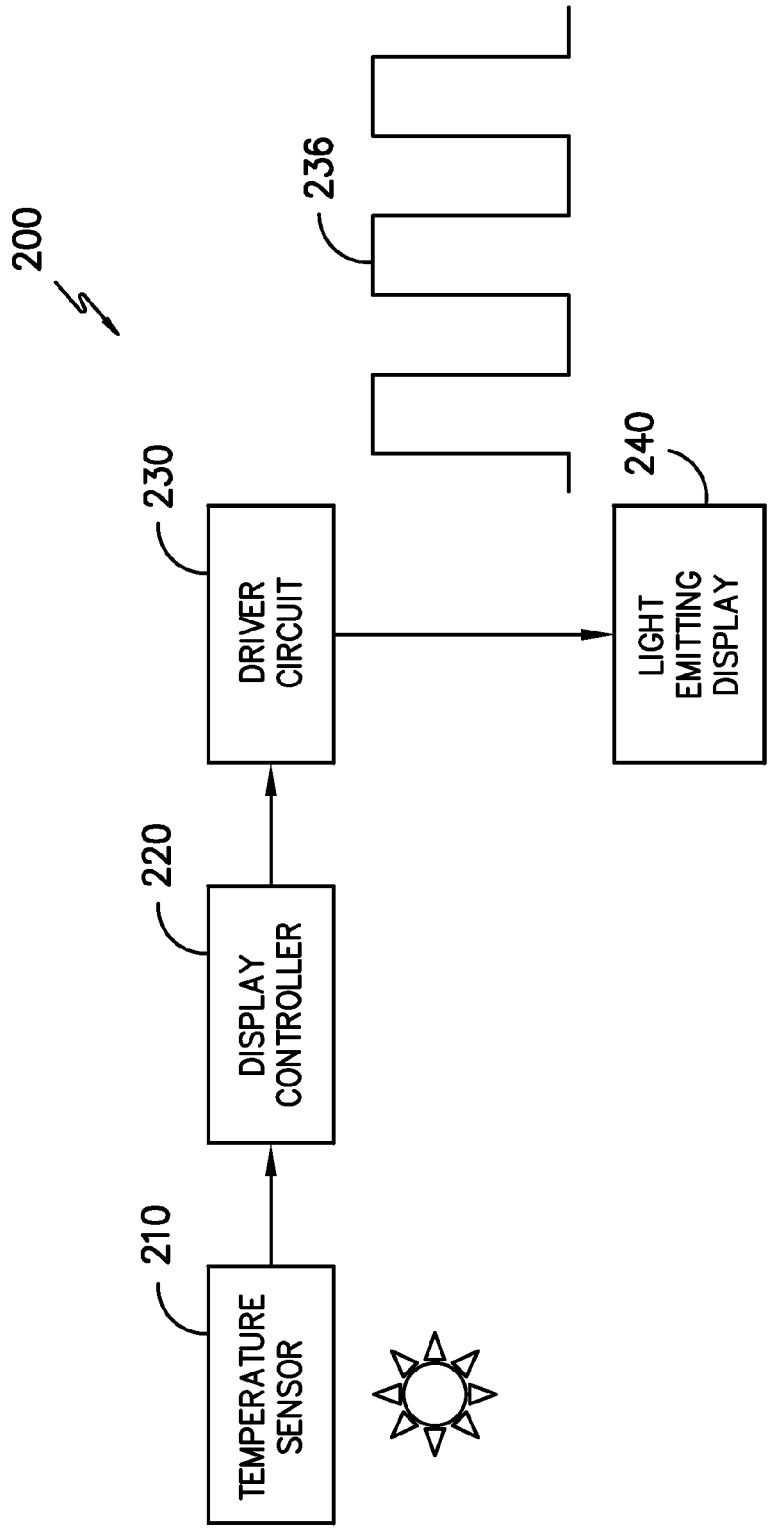
FIG. -4-

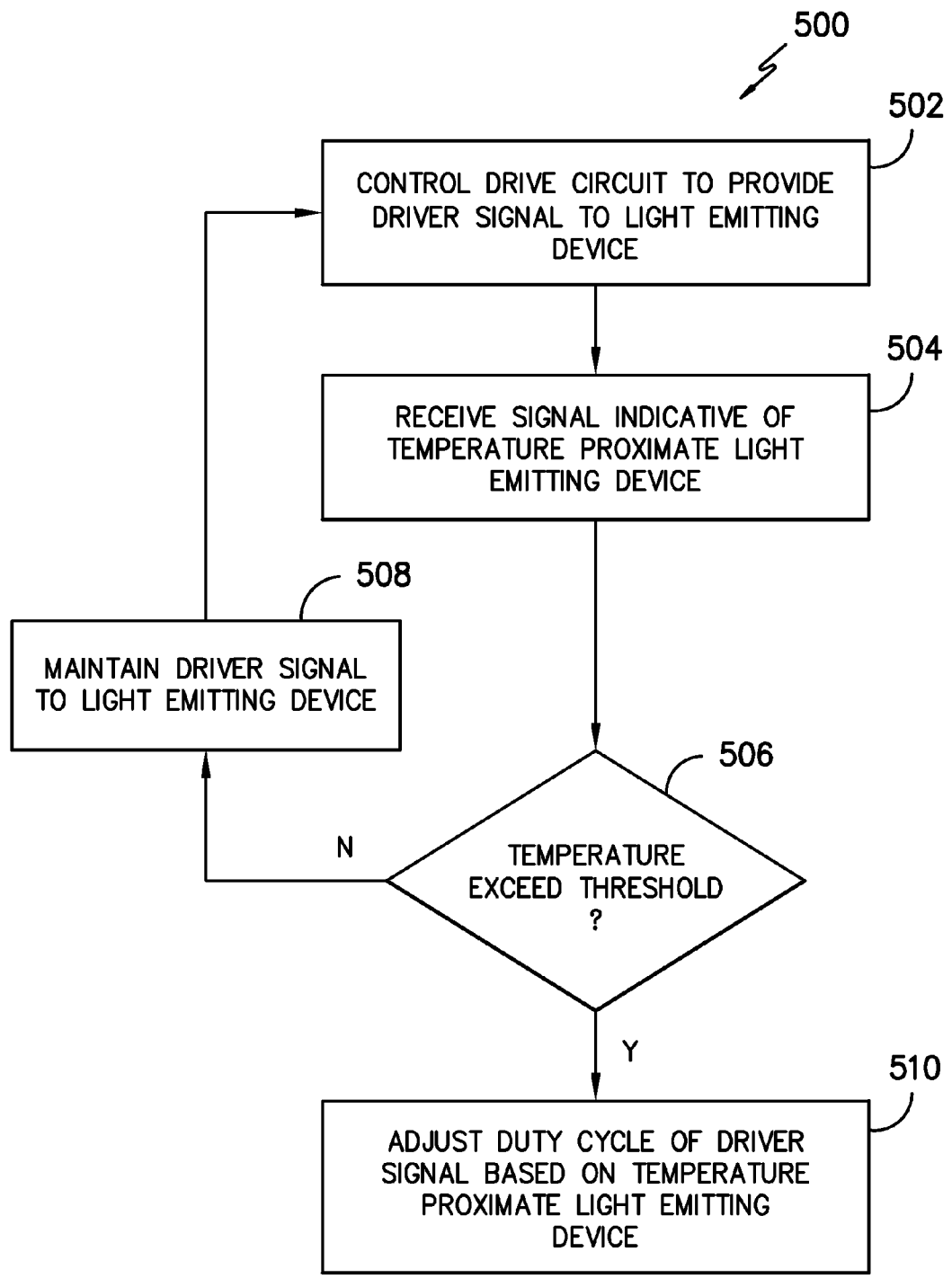
FIG. —5—

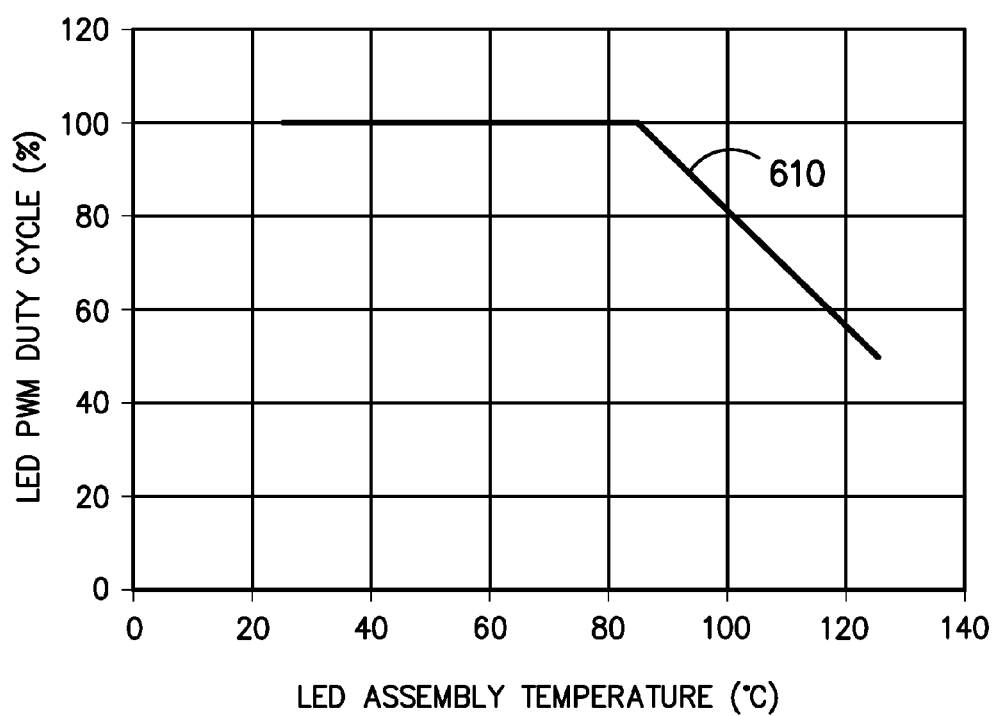
FIG. -6-

METHOD FOR CONTROLLING A LIGHT EMITTING DEVICE IN A COOKTOP APPLIANCE

FIELD OF THE INVENTION

The present subject matter relates generally to a cooktop appliance and more specifically to a system and method of controlling a light emitting device disposed on or under a surface of the cooktop appliance.

BACKGROUND OF THE INVENTION

Generally, cooktop appliances include a cooking surface that is configured for supporting cooking utensils. A heating source supplies thermal energy to the cooking utensils supported by the cooking surface. The cooktop appliance can also include a light emitting device. The light emitting device can provide light for assisting a user, e.g., by illuminating the cooking surface, by providing a visual indicator for certain features of the appliance, and/or by enhancing aesthetic appeal.

When the light emitting device is a light emitting diode (LED), driving the LED at a high current in a high temperature environment can cause reduced life, degraded performance, and/or even premature damage to or failure of the LED. Conventionally, LEDs are driven using a static (DC) driver signal. In other words, the driver signal supplied to the LED remains constant to achieve a desired light intensity level. To reduce the likelihood of damage to or degradation of the light emitting device from overheating due to its own internal power dissipation, a driver signal providing a reduced operating current can be provided to the LED. However, the reduced operating current can result in a reduced light output from the LED making viewing more difficult.

Thus, a need exists for an improved system and method of controlling a light emitting device disposed on a cooktop appliance.

BRIEF DESCRIPTION OF THE INVENTION

Aspects and advantages of the invention will be set forth in part in the following description, or may be apparent from the description, or may be learned through practice of the invention.

One exemplary aspect of the present disclosure is directed to an appliance having a cooktop. The appliance includes a light emitting device located proximate to a burner assembly of the cooktop. The burner assembly includes one or more burners. The light emitting device is configured to emit light at a light intensity level. The appliance further includes a controller configured to receive a signal indicative of a temperature in a region proximate the light emitting device. The controller is configured to adjust a driving signal supplied to the light emitting device based on the signal indicative of the temperature in the region proximate to the light emitting device using pulse width modulation of the driver signal.

Another exemplary aspect of the present disclosure is directed to a method of controlling a light emitting device in an appliance having a cooktop. The method includes supplying a driver signal to a light emitting device located proximate to a burner assembly of the appliance. The method further includes receiving a signal indicative of a temperature associated with a region proximate to the light emitting device and adjusting a duty cycle of the driver signal supplied to the light emitting device to reduce an operating temperature of the light emitting device based on the signal indicative of the temperature associated with the region proximate to the light emitting device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a perspective view of an exemplary cooktop according to an exemplary embodiment of the present disclosure;

FIG. 2 depicts a block diagram of a system for controlling a light emitting device of an exemplary cooktop according to an exemplary embodiment of the present disclosure;

FIG. 3 depicts a block diagram of a system for controlling a light emitting device of an exemplary cooktop according to an exemplary embodiment of the present disclosure;

FIG. 4 depicts a block diagram of a system for controlling a light emitting device of an exemplary cooktop according to an exemplary embodiment of the present disclosure;

FIG. 5 depicts a flow chart of a method of controlling a light emitting device of an exemplary cooktop according to an exemplary embodiment of the present disclosure; and FIG. 6 depicts a graphical representation of an exemplary control technique for varying the duty cycle of a driver signal based on temperature of a light emitting device according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to a system and method of variably controlling a driver signal supplied to a light emitting device (e.g. having one or more light emitting diodes (LEDs)) located proximate to a burner assembly of a cooktop appliance. More particularly, a duty cycle of a driver signal can be adjusted based on a signal indicative of a temperature in a region proximate to the light emitting device using pulse width modulation techniques. In one aspect, the signal indicative of a temperature in the region proximate the light emitting device can be provided by a temperature sensor located in the region proximate the light emitting device. Alternatively, the signal can be based on an anticipated temperature profile of the burner assembly. The anticipated temperature profile can be calculated based on transfer function correlating temperature with burner on-time or burner on-time in combination with the burner selected power level (heating setting).

According to aspects of the present invention, modifying a driver signal supplied to a light emitting device disposed in or on a cooktop appliance can provide an increase in life expectancy of the light emitting device. The duty cycle of the driver signal can be modified based on the temperature to reduce the operating temperature of the LED when the temperature in the region proximate to the light emitting device increases. In addition, a uniform light intensity level from the light emitting devices can also be maintained by varying the driver signal using pulse width modulation techniques.

FIG. 1 illustrates an exemplary embodiment of a cooktop appliance 100 that includes a material 102 providing a cooking surface 104. The material can be any suitable material, such as a metallic material (e.g. steel) or a non-metallic material such as glass, ceramics, or other suitable material. While the present subject matter will be discussed with reference to a gas cooktop appliance, those of ordinary skill in the art, using the disclosures provided herein, will appreciate that the present subject matter can be used with any cooktop appliance, such as an induction cooktop appliance.

Cooktop 100 can be installed in a chassis and in various configurations such as in cabinetry in a kitchen, coupled with one or more ovens or as a stand-alone appliance. A cooking utensil (e.g. pot, pan, etc.) holding food and/or cooking liquids (e.g., oil, water, etc.) can be placed onto grates 116 at a location of any of heating sources 106, 108, 110. Heat sources 106, 108, 110 can be configured in various sizes as shown so as to provide different heat inputs for cooking utensils of differing sizes and types. Grates 116 are supported on cooking surface 104. Cooking utensils can be placed onto grates 116 for cooking or heating foods and/or liquids.

Heating sources 106, 108, 110 provide thermal energy to cooking utensils on grates 116. As will be understood by those skilled in the art, heating sources 106, 108, 110 can have a variety of constructions. For example, heating sources 106, 108, 110 can be constructed as gas burners. In FIG. 1, heating sources 106, 108, 110 are gas burners that project through cooktop surface 104. However, heating sources of different shapes, locations, and configurations other than as shown in FIG. 1 can be used as well. For example, mechanisms associated with alternative heating sources can be positioned under cooking surface 104 as will be well understood of one of skill in the art using the teachings provided herein, in addition, the cooktop 100 can include heating sources in various configurations. For example, any number of heating sources can be disposed in any arrangement on the cooktop. Different types of heating sources, such as gas and electric, can also be included in the same cooktop 100.

Also, shown in FIG. 1 is a light emitting device assembly 200. Light emitting device assembly 200 is disposed within cooking surface 104 and serves as a visual indicator for certain functions of appliance 100. Alternatively, light emitting device assembly 200 can be disposed on a cooking surface 104. As illustrated in FIG. 1, a single light emitting device assembly 200 has a shape adapted to surround all of the heating sources 106, 108, 110.

Light emitting device assembly 200 can be illuminated during operation of heating sources 106, 108, 110. Thus, during operation of a particular one of heating sources 106, 108, 110, light emitting device assembly 200 can emit light, or, alternatively, a portion of light emitting device assembly 200 positioned adjacent the particular one of heating sources 106, 108, 110 can emit light. For example, light emitting device assembly 200 can emit red or any other color light to serve as a visual indicator during operation. In addition, light emitting display assembly 200 can function as an aesthetic device to improve the appeal of cooktop appliance 100 to consumers. In additional alternative embodiments, light emitting device assembly 200 can serve any other suitable purpose.

It should be understood that light emitting display assembly 200 shown in FIG. 1 is provided by way of example only, and the configuration shown in FIG. 1 is not intended to be limiting. Thus, it will be understood by those skilled in the art that other suitable configurations can be used as well. For example, rather the single rectangular profile surrounding heating elements 106, 108, 110 shown in FIG. 1, light emitting device assembly 200 can have a circular profile. Alternatively, light emitting display assembly 200 can be configured as multiple rectangular or circular profiles surrounding each particular heating element 106, 108, 110. In addition, a light emitting device assembly 200 can have various configurations. For instance, a light emitting device assembly can surround more than one, but less than all heating sources. A light emitting device assembly can also be disposed between the heating sources.

A user interface panel 112 is located within convenient reach of a user of the appliance 100. For this exemplary embodiment, panel 112 includes input components 114 that are each associated with one of heating sources 106, 108, 110. Input components 114 allow the user to selectively activate each heating source and determine the amount of heat input provided by each such element 106, 108, 110 to a cooking utensil location thereon. While input devices 114 are illustrated in FIG. 1 as knobs, the input components can include one or more of a variety of electrical, mechanical or electro-mechanical input devices including rotary dials (knobs), push buttons, toggle/rocker switches, and touch pads can also be used singularly or in combination with a capacitive touch screen input device component. The user interface panel 112 can also include a display component, such as a digital or analog display device designed to provide operational feedback to a user. For instance, the user interface panel can display whether a particular heating source is activated and/or the level at which the element is set.

Operation of cooking appliance 100 can be regulated by a controller (not shown) that is operatively coupled i.e., in communication with, user interface panel 112, light emitting device assembly 200, and heating sources 106, 108, 110. For example, in response to user manipulation of the input component 114 of user interface panel 112, the controller operates one of heating source 108. Similarly, in response to user manipulation of the input component 114 of user interface panel 112, the controller operates light emitting device assembly 200.

The user interface panel 112 can be in communication with the controller via one or more signal lines or shared communication busses. The user interface can be located on a different surface of the appliance, for instance, the angled front edge or the vertical backsplash or anywhere convenient for a user to access during operation of the cooktop.

FIGS. 2-4 provide a block diagram of an exemplary system 200 for controlling a light emitting device of a cooktop according to an exemplary embodiment of the present disclosure. Specifically, FIG. 2 illustrates the system 200 in general and FIGS. 3 and 4 illustrate system 200 in response to different temperatures. As shown in FIGS. 2-4, light emitting device control system 200 can include a temperature sensor 210, a controller 220, a driver circuit 230, and a light emitting device 240.

The temperature sensor 210 can be located in a region proximate a light emitting device 240 of the cooktop such that the temperature sensor can detect the temperature in the region proximate the light emitting device. In the case where the cooktop has a plurality of light emitting devices, the system 200 can include a plurality of temperature sensors 210. In particular, the system 200 can include a temperature sensor 210 associated with each of the plurality of light emitting devices 240. The temperature sensor 210 can be any suitable temperature sensor. For instance, the temperature sensor 210 can include, a thermocouple, a thermopile, a resistance temperature device, an infrared sensor, a thermistor, or other device suitable for monitoring the temperature in the region proximate the light emitting device 240. The temperature sensor 210 can detect the temperature in the region proximate the light emitting device 240 and provide a signal indicative of the temperature to the controller 220.

In an alternative embodiment, the controller 220 can receive a signal indicative of a temperature associated with the region proximate the light emitting device that is determined based on an anticipated temperature profile of the light emitting device. In this embodiment, the system 200 may or may not include a temperature sensor. The anticipated temperature profile of the light emitting device can be approximated using a transfer function correlating the temperature of the light emitting device to a selected power level for the burner assembly and/or a time period the burner is ignited. The transfer function can be implemented using one or more look-up tables, algorithms, equations, and/or models and can be based on a selected user input and other factors.

As will be discussed in more detail below, the controller 220 can process the signal indicative of the temperature in the region proximate the light emitting device 240 and provide a control command to the driver circuit 230 causing the driver circuit 230 to adjust a driver signal supplied to the light emitting device 240 based on the temperature in the region proximate the light emitting device 240. In the case where the cooktop has a plurality of light emitting devices, the controller 220 can independently adjust a driver signal provided to each of the plurality of light emitting devices 240 based on temperatures associated with each of the plurality of light emitting devices.

The controller 220 can be the only controller in the cooktop appliance such that controller 220 controls all operations of the cooktop. Alternatively, when the appliance includes a plurality of controllers, controller 220 can be a sub-controller coupled to the overall cooktop appliance controller or it could be the overall cooktop appliance controller. If controller 220 is a sub-controller, it can be located with the overall cooktop appliance controller or can be separate from the overall cooktop appliance controller.

By way of example, any/all of the "controllers" discussed in this disclosure can include a memory and one or more processing devices such as microprocessors, CPUs or the like, such as general or special purpose microprocessors operable to execute programming instructions or micro-control code associated with operation of a cooktop appliance. The memory can represent random access memory such as DRAM, or read only memory such as ROM or FLASH. In one embodiment, the processor executes programming instructions stored in memory. The memory can be a separate component from the processor or can be included onboard within the processor. The controller 220 can be positioned in a variety of locations throughout a cooktop appliance, For example, in the cooktop appliance 100 illustrated in FIG. 1, the controller can be located under or next to a user interface otherwise within a top panel, In such an embodiment, input/output ("I/O") signals can be routed between the controller and various operational components of appliance such as heating elements, controls, a display, sensor(s), alarms, and/or other components as can be provided. In one embodiment, a user interface panel can represent a general purpose I/O ("GPIO") device or functional block.

The controller 220 can be configured to adjust a driver signal supplied to the light emitting device 240 via the driver circuit 230 based on the signal indicative of the temperature associated with the light emitting device 240. For example, the controller 220 can determine whether to modify the driver signal based on the signal indicative of the temperature associated with the region proximate to light emitting device 240. If the temperature of the region is below a predetermined threshold, the driver signal provided to the light emitting device 240 can be maintained. For instance, the driver signal can be maintained as a constant magnitude (e.g. constant current) driver signal or can be maintained at a first duty cycle selected to provide a desired intensity of the light emitting device 240. If the temperature of the region exceeds a predetermined threshold, the controller 220 can adjust the driver signal in proportion to the temperature to extend the operating life of the light emitting device 240.

According to a particular aspect of the present disclosure, the controller 220 can be configured to adjust the driver signal using pulse width modulation (PWM) techniques. For instance, the controller 220 can adjust a duty cycle of the driver signal provided to the light emitting device 240. A duty cycle is a ratio between the duration a signal pulse is in the active state to the total period of the signal. In one aspect, the controller 220 can be configured to decrease the duty cycle of the driver signal as the temperature associated with region proximate to the light emitting device 240 increases.

For example, as shown in FIG. 3, the temperature sensor 210 can provide a signal indicative of a first temperature of the region proximate to the light emitting device 240 to the controller 220. The controller 220 can process the signal and send a control command to the driver circuit 230 to drive the light emitting device 240 with a driver signal 235 having a first duty cycle. In one particular implementation, the first duty cycle can be about 100% such that the driver signal is a constant magnitude (e.g. constant current) driver signal. The driver circuit 230 can provide the driver signal 235 with the first duty cycle to the light emitting device 240.

As shown in FIG. 4, the temperature sensor 210 can provide a signal indicative of a second temperature of the region proximate to the light emitting device 240 to the controller 220. The second temperature can be greater than the first temperature. The controller 220 can process the signal and send a control command to the driver circuit 230 to drive the light emitting device 240 with a driver signal 236 having a second duty cycle that is less than the first duty cycle. The driver circuit 230 can provide the driver signal 236 with the reduced duty cycle to the light emitting device 230.

The controller 220 can be configured to adjust the driver signal provided to the light emitting device 240 based on a temperature associated with a region proximate the light emitting device in various ways. Any suitable relationship between temperature associated with the region proximate the light emitting device 240 can be used without deviating from the scope of the present disclosure. The controller 220 can be configured to determine the appropriate duty cycle based on the temperature associated with the light emitting device using a look-up table, algorithm, model, or other suitable technique.

FIG. 6 depicts a graphical representation of one exemplary control technique for adjusting the duty cycle of a driver signal for a light emitting device based on a signal indicative of temperature associated with a region proximate the light emitting device according to an exemplary embodiment of the present disclosure. As shown by curve 610 of FIG. 6, the controller 220 maintains the duty cycle at about 100%, (i.e. the driver signal is a constitute magnitude, for instance constant current, drive signal) until the temperature in the region proximate the light emitting device reaches a predetermined threshold. Once the temperature exceeds the predetermined threshold (e.g. 70° C.), the duty cycle can be reduced linearly as a function of temperature.

FIG. 5 illustrates a flow chart of an exemplary method 500 according to an exemplary embodiment of the present disclosure. The method 500 can be implemented with any light emitting device control system, such as system 200 depicted in FIG. 2. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (502), a controller can control a drive circuit to provide a driver signal to a light emitting device. The driver signal can be selected to drive the light emitting device such that the light emitting device emits light at a desired light intensity. The driver signal can be a constant current driver signal or can be a PWM driver signal having a first duty cycle selected to drive the light emitting device to provide a desired light intensity.

At (504), a controller can receive a signal indicative of temperature proximate the light emitting device. For instance, the controller can receive a signal from a temperature sensor indicative of the temperature in the region proximate the light emitting device or a signal determined based on an anticipated temperature profile of the light emitting device.

At (506) the controller can process the signal to determine whether the temperature exceeds a predetermined threshold. If the temperature associated with the light emitting device does not exceed the threshold, the controller (506) can determine to maintain the driver signal in its current state. For instance, the controller can determine to maintain the driver signal to be a constant current driver signal or a PWM driver signal having the first duty cycle (510).

If the controller determines that the temperature associated with the light emitting device does exceed the predetermined threshold, the controller can determine to adjust the duty cycle of the driver signal using PWM techniques based on the temperature associated with the light emitting device (510). For instance, the controller can adjust the driver signal such that the duty cycle of the driver signal decreases as the temperature associated with the light emitting device increases as illustrated by curve 610 of FIG. 6. This can reduce an operating temperature of the light emitting device during increased ambient temperature situations, extending the life of the light emitting device.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance having a cooktop, comprising:
a light emitting device located proximate to a burner assembly of the cooktop, the burner assembly comprising one or more burners, the light emitting device configured to emit light at a light intensity level; and
a controller configured to receive a signal indicative of a temperature in a region proximate the light emitting device,
wherein the controller is configured to adjust a driver signal supplied to the light emitting device based on the signal indicative of the temperature in the region proximate to the light emitting device using pulse width modulation of the driver signal;
wherein the signal indicative of the temperature in the region proximate to the light emitting device is based on an anticipated temperature profile of the light emitting device, wherein the anticipated temperature profile of the light emitting device is determined based on a transfer function correlating temperature to a selected power level for the burner assembly and a time period the burner assembly is ignited.

2. The appliance as in claim 1, wherein the appliance comprises a plurality of light emitting devices, each of the plurality of light emitting devices associated with one or more burners of the burner assembly.

3. The appliance as in claim 2, wherein the controller is configured to receive a signal indicative of a temperature associated with each of the plurality of light emitting devices.

4. The appliance of claim 3, wherein the controller is configured to independently adjust the driver signal supplied to each of the plurality of light emitting devices.

5. The appliance as in claim 1, wherein the controller is configured to adjust the driver signal supplied to the light emitting device to maintain the light intensity level of the light emitting device.

6. The appliance as in claim 1, wherein the driver signal is adjusted by varying the duty cycle of the driver signal.

7. The appliance as in claim 6, wherein the controller is configured to decrease the duty cycle of the driver signal upon an increase in the temperature in the region proximate the light emitting device.

8. The appliance as in claim 1, wherein the light emitting device includes at least one light emitting diode.

9. The appliance as in claim 1, wherein the light emitting device has a shape adapted to surround the burner assembly of the appliance.

10. A method of controlling a light emitting device in an appliance having a cooktop, comprising:
supplying a driver signal to a light emitting device located proximate to a burner assembly of the appliance;
receiving a signal indicative of a temperature associated with a region proximate to the light emitting device; and
adjusting the duty cycle of the driver signal supplied to the light emitting device to reduce an operating temperature of the light emitting device based on the signal indicative of the temperature associated with the region proximate to the light emitting device;
wherein the signal indicative of the temperature associated with the region proximate the light emitting device is based on an anticipated temperature profile of the light emitting device, wherein the anticipated temperature of the light emitting device is determined based on a transfer function correlating temperature to a selected power level for the burner assembly and a time period the burner assembly is ignited.

11. The method as in claim 10, wherein receiving a signal indicative of a temperature associated with the region proximate to the light emitting device of the appliance comprises receiving a signal from a temperature sensor located in the region proximate to the light emitting device.

12. The method as in claim 10, wherein adjusting the driver signal supplied to the light emitting device to control the light intensity level based on the signal indicative of the temperature associated with the region proximate to the light emitting device comprises:
    comparing the temperature associated with the region proximate to the light emitting device with a predetermined temperature threshold;
    maintaining a duty cycle of the driver signal supplied to the light emitting device when the temperature associated with the region proximate to the light emitting device is below the predetermined temperature threshold; and
    modifying the duty cycle of the driver signal supplied to the light emitting device when the temperature associated with the region proximate to the light emitting device is above the predetermined temperature threshold.

13. The method as in claim 12, wherein maintaining the duty cycle of the driver signal supplied to the light emitting device comprises maintaining the duty cycle at about 100% such that the driver signal is a constant magnitude driver signal.

14. The method as in claim 12, wherein modifying the duty cycle of the driver signal supplied to the light emitting device comprises decreasing the duty cycle of the driver signal upon an increase in the temperature in the region proximate the light emitting device.

15. The method as in claim 10, wherein the light emitting device comprises at least one light emitting diode and has a shape adapted to surround the burner assembly of the appliance.

* * * * *